United States Patent [19]

Mason

[11] 4,171,338

[45] Oct. 16, 1979

[54] PROCESS FOR ULTRA-HIGH MOLECULAR WEIGHT, HIGH ABRASION RESISTANCE, CROSS-LINKED POLYETHYLENE

[75] Inventor: Charles D. Mason, Chatham Township, Morris County, N.J.

[73] Assignee: Allied Chemical Corporation, Morris County, N.J.

[21] Appl. No.: 847,644

[22] Filed: Nov. 1, 1977

[51] Int. Cl.$^2$ .............................................. D01F 1/02
[52] U.S. Cl. ..................................... 264/211; 264/236
[58] Field of Search ..................... 526/57, 352, 22, 73; 264/347, 236, 24

[56] References Cited

U.S. PATENT DOCUMENTS

| | | | |
|---|---|---|---|
| 2,993,882 | 7/1961 | Ashby et al. | 526/19 |
| 3,144,436 | 8/1964 | Green et al. | 526/57 |
| 3,171,830 | 3/1965 | Kehr | 526/57 |
| 3,444,155 | 5/1969 | Fish | 526/57 |
| 3,567,697 | 3/1971 | Bates et al. | 260/78.4 |
| 3,576,933 | 4/1971 | Batar et al. | 264/94 |
| 3,578,647 | 5/1971 | Gregorian et al. | 526/57 |
| 3,887,534 | 6/1975 | Baba et al. | 526/57 |
| 3,936,523 | 2/1976 | Kleeberg et al. | 264/236 |
| 3,956,253 | 5/1976 | Braun | 526/57 |
| 4,049,757 | 9/1977 | Kammel et al. | 264/236 |
| 4,091,195 | 5/1978 | Vitek | 526/57 |

*Primary Examiner*—Jay H. Woo
*Attorney, Agent, or Firm*—Alan M. Doernberg; Jay P. Friedenson

[57] ABSTRACT

A process is provided for preparing ultrahigh molecular weight, high abrasion resistant polyethylene compositions, wherein ultrahigh molecular weight polyethylene resin is admixed with about 0.01 to 0.1 weight percent organic peroxide and the admixture introduced at elevated temperatures into a melt shaping apparatus such as a ram extruder. The ultrahigh molecular weight polyethylene is cross-linked to still higher molecular weight compositions during melt shaping thereby resulting in a composition having superior abrasion resistance.

6 Claims, 1 Drawing Figure

PROCESS FOR ULTRA-HIGH MOLECULAR WEIGHT, HIGH ABRASION RESISTANCE, CROSS-LINKED POLYETHYLENE

BACKGROUND OF THE INVENTION

This invention relates to a process for preparing ultra-high molecular weight, high abrasion resistant polyethylene compositions.

Ultrahigh molecular weight linear polyethylene, having a viscosity average molecular weight of at least about 1,000,000 and a density of between about 0.92 and 0.99 has been known in the art for some time. These ultrahigh molecular weight polyethylene compositions have outstanding physical properties such as toughness, impact strength, abrasion resistance, low coefficient of friction as well as excellent resistance to attack by solvents and corrosive chemicals. Owing to these superior physical and chemical properties, these compositions are suitable for use in such demanding applications as vibration dampener pads, hydraulic cyclinders, mallet heads, flexible drive couplings, gears, belt and chain guides, etc.

It is known that ultrahigh molecular weight polyethylene can be cross-linked to still higher molecular weights by using free radical initiators. For example, U.S. Pat. Nos. 3,567,697 and 3,576,933 disclose a method for preparing melt shaped articles of cross-linked polyolefin compositions, such as polyethylene, wherein free radical initiators are used as crosslinking agents. These references teach that the polyethylene resin and free radical initiator must first be mixed, then melt shaped before cross-linking. The concentration of initiator is also substantially higher than the concentration needed to cross-link the resins according to the present invention.

Since ultrahigh molecular weight polyethylene compositions are extremely difficult to melt shape by conventional techniques such as injection molding, standard extrusion, thermoforming, etc., melt shaping is generally achieved by compression molding. Another technique sometimes used for meltshaping these high molecular weight compositions is ram extrusion wherein the resin is fed into one end of a straight tube, pushed through a heated zone and taken from the other end as a sintered rod or tube. Ram extrusion of ultrahigh molecular weight polyethylene in the presence of 0.2 to 0.6 weight percent organic peroxide is disclosed in U.S. Pat. No. 3,956,253, which is substantially in excess of the amount of initiator used herein. None of these references suggest that less than 0.100 weight percent of certain selected peroxides are suitable for preparing cross-linked ultrahigh molecular weight, high abrasion resistant polyethylene compositions.

SUMMARY OF THE INVENTION

In accordance with this invention, there is provided a process for preparing ultra-high molecular weight, high abrasion resistant polyethylene compositions wherein ultrahigh molecular weight polyethylene having a viscosity average molecular weight of at least about 1,000,000 and a density of between about 0.92 and 0.99 as determined by ASTM Method D 792 is cross-linked and melt-shaped simultaneously in the presence of very small quantities of one or more organic peroxides having a half life from about 15 seconds to 3 minutes at 190° C. Such peroxides include those selected from the group consisting of 2,5-dimethyl 2,5-(t-butylperoxy)-hexyne-3, 2,5-dimethyl-2,5-di(t-butyl-peroxy)hexane and 1,3di-t-butylperoxy diisopropylbenzene. It has been discovered that by lowering the peroxide level to very small amounts of from about 0.01 to 0.1 weight percent, as opposed to larger amounts or none at all, an ultrahigh molecular weight polyethylene resin can be cross-linked and melt-shaped simultaneously thereby producing a polyethylene resin having superior abrasion resistance.

The initial polyethylene resin and about 0.01 to 0.1 weight percent peroxide initiator are fed into a melt-shaping device at elevated temperatures whereby the ultrahigh molecular weight polyethylene resin is cross-linked to higher molecular weights during melt shaping. Preferably the melt-shaping device is either a compression molding means or a ram extruder. In the case of ram extrusion, the ram extruder preferably contains four temperature zones. Zone one, which represents the initial zone through which the resin passes, is maintained at a temperature of about 180° C. to 200° C., preferably 190° C. Zone two is maintained at a temperature of about 180° C. to 220° 1 C., preferably 200° C. Zone three is maintained at a temperature of about 190° C. to 230° C., preferably 220° C. And Zone four is maintained at a temperature of 170° C. to 210° C., preferably 185° C.

BRIEF DESCRIPTION OF THE DRAWING

The present invention will be further illustrated by reference to the drawing which shows the abrasion resistance of a cross-linked polyethylene resin composition prepared in accordance with the present invention at various peroxide concentration levels. This drawing also shows that as the concentration of peroxide is varied outside the preferred range of 0.01 to 1.0 wt.%, abrasion resistance is adversely affected.

DETAILED DESCRIPTION

Figure 1:
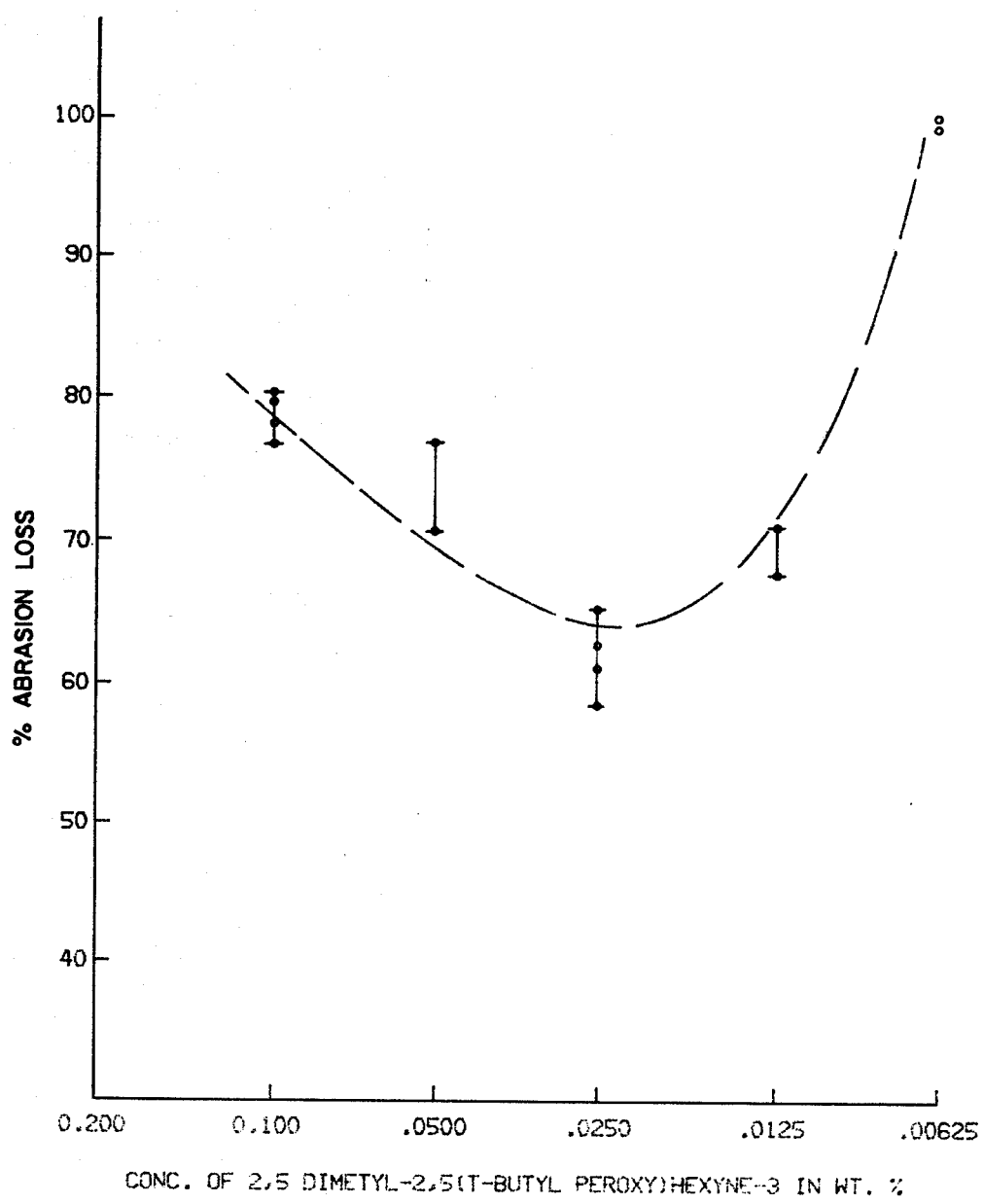

The term "polyethylene" as used herein includes homopolymers of ethylene as well as copolymers obtained by reacting ethylene with a small amount of a comonomer. Non-limiting examples of such comonomers include $C_3$ to $C_8$ 1-alkenes such as propylene, butene-1,2-methylpropene-1, 4-methylpentene-1, and pentene-1 and the like, as well as mixtures thereof. Generally the copolymer contains at least 85 weight percent, and preferably not less than 96 weight percent of polymer units derived from ethylene. Such copolymers have essentially the same characteristics as the ethylene homopolymer of the same molecular weight, e.g. the preforming and sintering characteristics are the same.

The polyethylene resin suitable for use as starting material in the present invention may be prepared by any conventional procedure. One such procedure is a low pressure ethylene polymerization process using a chromium oxide catalyst on a silica or silicaalumina support in paraffinic or cycloparaffinic solvent thereby forming polyethylene in solution or as discrete particles in a hydrocarbon slurry. Another procedure suitable for preparing polyethylene suitable for use herein is the Zeigler process which teaches the use of an active metal alkyl catalyst, or by such other processes as described in U.S. Pat. No. 3,050,514 or especially the process outlined in U.S. Pat. No. 3,051,993. The latter process involves at least intermittently contacting anhydrous oxygen-free ethylene in the gaseous phase with an inorganic, porous, frangible, solid contact catalyst prepared from an inorganic compound of chromium and oxygen and an active metal alkyl.

Preferably, the ultrahigh molecular weight polyethylene compositions suitable as starting materials in the process of the present invention are linear polyethylene resins having a molecular weight, as calculated from viscosities in decalin solution at 135° C. by the P. Francis et al. formula $[N]=6.77\times10^{-4}(M^{0.67})$ (c.f. P. Francis et al. *J. Pol. Sci.* 31, 453 (1958)) in excess of about $1\times10^6$, preferably from about $1\times10^6$ to $5\times10^6$. The densities of these resins are from about 0.92 to 0.99, preferably from about 0.935 to 0.960 at 23° C., as determined by ASTM Method D792. Their crystalline melting point is in the order of about 275° F.

Generally, the initiator suitable for use in the present invention are organic peroxides having a half life of about 15 seconds to 3 minutes at 190° C. and which are capable of initiating cross-linking of high density polyethylene. Non-limiting examples of such peroxides are 2,5-dimethyl-2,5-(t-butylperoxy)hexyne-3, 2,5-dimethyl-2,5-di-(t-butylperoxy)hexane and 1,3-di-t-butylperoxydiisopropylbenzene, preferred is 2,5-dimethyl-2,5(t-butyl peroxy)hexyne-3. By initiator half life, we mean the time required for one half of the free-radical initiator to be dissociated.

Although any melt shaping device can be used as long as it is capable of handling ultrahigh molecular weight materials, it is preferred to use ram extrusion or compression molding, most preferably ram extrusion.

Ram extruders suitable for use in the present invention contain a ram pushing means and a straight tube die having several heating zones, preferably four. An admixture of resin and initiator is fed (charged) into one end of the extruder. Downward movement of the ram first compacts the resin, then forces the compacted charge a distance down the die. The compacted resin in the die is known as a preform. Subsequent recharging of the die and cycling of the ram moves the resin preform through the heated zones where it sinters (gels). The resin preform is then moved through the cooling zone, and finally out of the extruder. Although ram extruders can be mounted either vertically or horizontally, it is preferred to prepare the instant compositions with a vertically mounted extruder. This assures a more uniform and concentric product.

The admixture passing through the extruder must be heated from room temperature to above its gel temperature, but not heated so high that thermal degradation takes place. External heater bands usually supply heat by conduction through the heat sinks and die walls, but other means of supplying heat to the heating zones may be used. Preferably the ram extruder has four consecutive heating zones with bath cooling zones on either ends. The temperature of zone 1 is about 180° C. to 200° C., preferably 190° C. The temperature of zone 2 is maintained at about 180° C. to 220° C., preferably 200° C. The temperature of zone 3 is maintained at about 190° C. to 230° C., preferably 220° C., and the temperature of zone 4 is maintained at about 170° C. to 210° C., preferably 185° C.

Other conventional compression molding apparatus and processes are also suitable for use in the present invention as long as they can handle high moelcular weight resins. Non-limiting examples of such processes include direct compression molding, preheated powder processes and preform processes as set forth in "Design and Fabrication Guide", Bulletin DFG-18 distributed by Hercules Incorporated. Teledynamic injection molding techniques, an example of which is described in Modern Plastics, February 1975, p. 80 is also suitable for use for handling the resins of the present invention.

It is important that a homogeneous mixture of resin and peroxide be prepared before melt shaping in order to provide uniform cross-linking. Any conventional mixing means may be used as long as the peroxide is homogeneously distributed throughout the polyethylene resin.

Abrasion resistance of the materials herein were measured similar to the procedure set forth in *Abrasion-Resistant 1900 UHMW Polymer*, a booklet prepared by Hercules Inc. Generally the procedure consists of abrading the test specimen and a reference material under comparable conditions. Specifically the procedure consists of mounting two ½ horsepower motors of 1750 RPM so that a six inch long, ⅜ inch diameter shaft can be attached to each extending downward from the motors. A representative 3 inch long cylindrical shaped sample is cut from the extrudate to be tested. A ⅜" hole is drilled in this sample from the center at one of its end surfaces and extended half way through its length. The sample is then secured to the end of one of a shafts attached to a motor. A comparable reference plastic cylinder is prepared from the same high molecular weight resin as that from which the sample to be tested was prepared, but containing no initiator, and mounted on the shaft attached to the other motor. This reference sample is ram extruded under identical conditions as the test sample. Containers about 14 inches in diameter and about 8 inches deep were positioned under the sample cylinders so that the samples were about 1½ inches from the bottom of the containers. A sand slurry comprised of 5000 ml of water and 5000 ml of builders sand was introduced into each container. The motors were run with the samples attached thereto and submerged in the sand slurry for a representative period of time. The samples were then weighed and the percent loss in weight of each was calculated.

This invention may best be illustrated by the following non-limiting examples.

EXAMPLE I

All samples herein were prepared by blending 1500 parts by weight of a high density polyethylene having a viscosity average molecular weight of 2.5 to $2.6\times10^6$ and a density of 0.936, and various parts by weight of 2,5-dimethyl-2,5-(t-butylperoxy)hexyne-3 in a drum for 4 hours at 23° C. The resulting powder blend resin was vibrated into the entrance of a ram extruder wherein a ram pressure compacted the powder and moved it through the first heated zone of the extruder. The compacted powder resin melted, forming a preform and was pushed further down the ram extruder by subsequent charges. As the molten polymer exited, it was air cooled. The extruder was adjusted so that the rate of vibration of powder into the entrance of the extruder and the rate of extrusion of the product are comparable. The temperature of the four heating zones of the extruder were:

| Zone 1 188° C. | Zone 3 216° C. |
| Zone 2 193° C. | Zone 4 193° C. |

The extruder was adjusted so that the rate of extrusion was about 2 to 3 inches per minute and the ram pressure was about 60 to 75 lb/in².

Cylindrical shaped samples having a length of three inches and a diameter of 1 inch were prepared and attached to the abrasion apparatus discussed previously. The test samples as well as a control for each were rotated at 1750 RPM in the sand slurry for 6 hours. The percent loss in weight of each was calculated and the relevant data is shown in the table below.

Abrasion Resistance of Peroxide Cured
HDPE During Ram Extrusion

| Peroxide conc, wt. % | Cured Sample Wt. Loss of (A) | Control Wt. Loss of (B) | % Abrasion Loss A/B × 100 |
| --- | --- | --- | --- |
| 0.100 | 0.4801g | 0.5982g | 80.26 |
| 0.100 | 0.5000 | 0.6497 | 76.95 |
| 0.100 | 0.4570 | 0.6002 | 79.14 |
| 0.100 | 0.7099 | 0.9030 | 78.62 |
| 0.0500 | 0.3363 | 0.4364 | 77.06 |
| 0.0500 | 0.7471 | 1.0606 | 70.45 |
| 0.0250 | 0.3760 | 0.5840 | 64.38 |
| 0.0250 | 0.2384 | 0.3807 | 62.62 |
| 0.0250 | 0.2524 | 0.4314 | 58.51 |
| 0.0250 | 0.3992 | 0.6508 | 61.34 |
| 0.0250 | 0.2930 | 0.4329 | 67.68 |
| 0.0125 | 0.7506 | 1.0640 | 70.55 |
| 0.0125 | 0.5309 | 0.7981 | 66.52 |
| 0.0075 | 0.4095 | 0.4107 | 99.46 |
| 0.0075 | 0.6729 | 0.6771 | 99.37 |

The above table, which is illustrated in the drawing, shows that as the peroxide concentration is increased or decreased from the most preferred 0.025 wt.% range, the abrasion resistance of the resulting cross-linked polyethylene is adversely affected.

EXAMPLE II 1500 parts by weight of high density polyethylene having a viscosity average molecular weight of 2.5 to $2.6 \times 10^6$ and a density of 0.936 was blended in a drum for 4 hours at 23° C. with 0.75 parts of 2,5-dimethyl-2,5-(t-butylperoxy)hexyne-3. Approximately 70 g of this mixture was introduced into a 4"×3½"×1" forming mold for compression molding. The mixture was leveled in the cavity and the male insert set in place. The mixture was compacted at room temperature by hydraulic pressure to a preform having the dimensions 4"×3½"×⅜". The preform was then placed in a 4"×3½"×¼" mold and compression molded in a hydraulic press at a temperature of about 200° C. and a pressure of about 1500 psi. The molding and simultaneous cross-linking of the mixture is continued for about 12 minutes, after which the resulting product is cooled under pressure to room temperature and removed from the mold.

The molded material was machined to 1"×3"×¼" and tested for abrasion resistance which was found to be about 76% wear (or abrasing loss) based on the control sample containing no peroxide which represented 100% wear.

What is claimed is:

1. In a method for preparing abrasion resistance polyethylene compositions which comprises:
    (a) homogeneously mixing an organic peroxide with an ultra-high molecular weight polyethylene powder, said polyethylene powder having a viscosity average molecular weight of at least about 1,000,000 and a density of between about 0.92 and 0.99 as determined by ASTM Method D 792;
    (b) introducing the homogeneous mixture into a melt shaping apparatus; and
    (c) melt shaping and simultaneously cross-linking the polyethylene, the improvement which comprises introducing, as the organic peroxide, about 0.01 to 0.1 weight percent based on the total weight of the composition, of an organic peroxide having a half life from about 15 seconds to 3 minutes at 190° C.

2. The method of claim 1 wherein the melt shaping device is a ram extruder or a compression molding means.

3. The method of claim 1 wherein the melt shaping device is a ram extruder.

4. The method of claim 1 wherein the organic peroxide is selected from the group consisting of 2,5-dimethyl-2,5-(t-butylperoxy)hexyne-3, 2,5-dimethyl-2,5-di-(t-butylperoxy)hexane and 1,3-di-t-butyl-peroxydiisopropylbenzene.

5. The method of claim 1 wherein the organic peroxide is 2,5-dimethyl-2,5(t-butylperoxy)hexyne-3.

6. The process of claim 1 wherein the polyethylene powder has a density of between about 0.935 and 0.960.

* * * * *